US012682007B2

(12) United States Patent
Saldanha et al.

(10) Patent No.: US 12,682,007 B2
(45) Date of Patent: Jul. 14, 2026

(54) SERVER, SYSTEMS AND METHODS FOR INDUSTRIAL PROCESS VISUAL ANOMALY REPORTING

(71) Applicant: AVEVA SOFTWARE, LLC, Lake Forest, CA (US)

(72) Inventors: Ryan Saldanha, Anaheim, CA (US); Vinay T. Kamath, Coto De Caza, CA (US); Arumuga Sivasubbu, Trabuco Canyon, CA (US); Dylan Thompson, Santa Ana, CA (US); Aarthy Ravindran, Mission Viejo, CA (US)

(73) Assignee: Aveva Software, LLC, Lake Forest, CA (US)

( * ) Notice: Subject to any disclaimer, the term of this patent is extended or adjusted under 35 U.S.C. 154(b) by 581 days.

(21) Appl. No.: 18/071,273

(22) Filed: Nov. 29, 2022

(65) Prior Publication Data

US 2023/0169145 A1 Jun. 1, 2023

Related U.S. Application Data

(60) Provisional application No. 63/284,316, filed on Nov. 30, 2021.

(51) Int. Cl.
*G06F 17/18* (2006.01)
(52) U.S. Cl.
CPC .................................... *G06F 17/18* (2013.01)
(58) Field of Classification Search
None
See application file for complete search history.

(56) References Cited

U.S. PATENT DOCUMENTS

| | | | | |
|---|---|---|---|---|
| 10,448,585 | B2 * | 10/2019 | Kundra | A01G 25/16 |
| 2002/0169735 | A1 * | 11/2002 | Kil | G06N 5/022 |
| | | | | 706/46 |
| 2008/0222705 | A1 | 9/2008 | Goodmon et al. | |
| 2018/0052835 | A1 | 2/2018 | Billi-Duran et al. | |
| 2019/0019280 | A1 | 1/2019 | Rao et al. | |

FOREIGN PATENT DOCUMENTS

| | | |
|---|---|---|
| EP | 3690581 A1 | 8/2020 |
| KR | 101961820 B1 | 3/2019 |

OTHER PUBLICATIONS

International Search Report and Written Opinion for related International Application No. PCT/US2022/051260, dated Mar. 31, 2023, 10 pages.

* cited by examiner

*Primary Examiner* — Walter L Lindsay, Jr.
*Assistant Examiner* — Geoffrey T Evans
(74) *Attorney, Agent, or Firm* — Dergosits & Noah LLP; Todd A. Noah

(57) ABSTRACT

The disclosure is directed to a system for integrating multimedia files into an anomaly detection system according to some embodiments. In some embodiments, the system supports retrieval of one or more files and/or images in different conventional formats. In some embodiments, the system is configured to generate a visualization of stored Multi Media Files in a graphical user interface. In some embodiments, the system is configured to support downloading the media files such as one or more images and/or videos. In some embodiments, the system is configured to filter specific to visual anomaly news based on asset hierarchy. In some embodiments, the system includes an extensible infrastructure to enable integration with any system.

15 Claims, 7 Drawing Sheets

Download News Visual(s) as ImageFile
EndPoint: api/analytics/v1/news/DownloadNewsImage Method: POST Request Payload:

```
{
  "newsId": "f4708c7c-e818-4964-889e-fd65f7bf9b41",
  "imageDownloadType":"ImageFile",
  "imageIndex":1
}
```

| No | Field Name | Type | Is Mandatory | Description |
|---|---|---|---|---|
| 1 | newsId | String | Yes | Valid GUID is expected otherwise throw 400 Bad Request |
| 2 | imageDownloadType | ENUM | Yes | Supported values<br>-ImageFile<br>-Base64String<br><br>Note: Other than above, returns 400 Bad Request |
| 3 | imageIndex | Integer | No | If field presents, it's value should be > 0, otherwise throw 400<br><br>Default is 1. |

FIG. 2

Download News Visual(s) as Base64String

EndPoint: api/analytics/v1/news/DownloadNewsImage

Method: POST

Request Payload:

```
{
   "newsId": "f47003c7c-e818-4364-869e-fd65f7b49a41" ,
   "imageDownloadType": "Base64String" ,
   "imageCount":1
}
```

| No. | Field Name | Type | Is Mandatory | Description |
|---|---|---|---|---|
| 1 | newsId | String | Yes | Valid GUID is expected otherwise throw 400 Bad Request |
| 2 | imageDownloadType | ENUM | Yes | Supported values<br>-imageFile<br>-Base64String<br><br>Note: Other than above, returns 400 Bad Request |
| 3 | imageCount | Integer | No | If field presents, it's value should be > 0, otherwise throw 400<br><br>Default is 1. |

Response: Image data will be showed in response in base64 format

Sample Response:

```
{
   "imageData": [ "iVBORw0KGgoAAAANS..." , "-" ]
}
```

Note: If image is not existing in blob, it will return 400

FIG. 3

Upsert news image in base64
EndPoint: api/analytics/v1/news
Method: POST
Request Payload:

```
{
  "Upsert": {
    "Type": "News",
    "Values": [
      {
        "score": 100,
        "fqn": "AlarmData.ESCIMTEST.SysTimeSec",
        "fqns": [
          "AlarmData.ESCIMTEST.SysTimeSec"
        ],
        "algorithm": "visualanomaly",
        "author": "WF",
        "datetime": "2020-09-27T15:31:44.037Z",
        "timeOfOccurrence": "2020-09-27T15:31:44.037Z",
        "source": "AlarmData",
        "html": "<div>{{Visual_ANOMALY_TITLE}}</div><news-chart data=\"post_chart1\" class=\"news-figure\"></news-chart><div ng-show=\"expanded\"><p>{{MORE_TAG1}}</p></div>",
        "localizationParams": {
          "asset": "/AlarmViewer/",
          "assetAnomalyScore": 100,
        },
        "imagedata": ["iVBORw0KggoAAAANSUhEUgAAAZPAAAA)KCAYAAABpxagbAAAgAEIEQ...."],
        "units": "None",
        "timezone": "America/Los_Angeles",
        "user": "news@wonderware.com",
        "assetid": "efb3cafa-4919-4bac-aea6-0635c1452500",
        "schemaversion": "1.6",
        "ShowInClientDateTime": true,
        "location": "",
      }
    ]
  }
}
```

| SNo | Field Name | Type | Is Mandatory | Description |
| --- | --- | --- | --- | --- |
| 1 | imageData | List of Base64String | Yes | Valid Base64String otherwise throw 400 Bad request |

FIG. 4

SERVER, SYSTEMS AND METHODS FOR INDUSTRIAL PROCESS VISUAL ANOMALY REPORTING

CROSS-REFERENCE TO RELATED APPLICATION

This application claims the benefit of and priority to U.S. Provisional Application No. 63/284,316, filed Nov. 30, 2021, which is incorporated herein by reference in its entirety.

BACKGROUND

Current industrial monitoring systems do not have efficient ways to provide visual data to a user. While numerical values may be useful, they do not provide an efficient method to assess alarms associated with visual defects. Therefore, there is a need in the art for a system that is able to detect visual anomalies and display them in a report and/or news feed.

SUMMARY

Industrial processes are increasingly complex and reliability issues are a significant concern. Data related to these processes can be overwhelmingly complex and difficult to analyze by operators and maintenance personnel even when using conventional analytical tools. Such conventional tools have failed to provide computationally efficient systems for detecting visual anomalies in industrial processes and displaying data relating to those anomalies in readily understood formats. Such conventional tools have also not used artificial intelligence to accurately detect anomalies.

System and methods described herein relate to detecting visual anomalies and displaying them in a report and/or news feed. In some embodiments, the system is configured to utilize artificial intelligence to analyze images received from one or more cameras and report visual anomalies within the images. As used herein, the term "image" includes any type of media or multi-media file including pictures, videos, audio files, and the like. In some embodiments, the system is configured to detect a visual anomaly by comparing a received image to a training data set of images and returning an alarm if artificial intelligence determines image differs by a predetermined confidence level.

In some embodiments, the system is configured to be integrated into conventional monitoring detection systems. In some embodiments, the system is configured to receive images including visual anomalies from conventional monitoring detection systems. In some embodiments, the system is configured to associate multi-media files to an anomaly detection system. As used herein, "multi-media" means any single or plurality of types of media. In some embodiments, the system is configured to associate multi-media files to an anomaly detection system in different formats. In some embodiments, the system is configured to display stored multi-media files in a graphical user interface (UI). In some embodiments, the system is configured to generate a responsive rendering of the multi-media file. In some embodiments, the system is configured to enable a download of the multi-media file from the UI. In some embodiments, the system is configured to filter specific visual anomaly new based on asset hierarchy.

In some embodiments, the system is configured to associate one or more received images with an equipment tag and/or trend chart. In some embodiments, the system is configured to display the multi-media file by clicking on at least a portion of a chart.

DRAWING DESCRIPTION

FIG. 2 shows a download news visual(s) as imageFile request according to some embodiments.

FIG. 3 shows a download news visual(s) as Base64String request according to some embodiments.

FIG. 4 depicts an upsert news image in Base64String request according to some embodiments.

DETAILED DESCRIPTION

In some embodiments, the system includes an anomaly algorithm configured to detect, store, and/or retrieve anomalies associated with images. In some embodiments, the system includes a managed historian news microservice API that is configured to store/retrieve one or more images using binary large object database fields (blobs).

In some embodiments, the system includes a predictive analytic module configured to use artificial intelligence (e.g., machine learning) to analyze one or more asset's operating history and create one or more operational profiles for one or more pieces of equipment. In some embodiments, the predictive analytic module is configured to compare historical operating data with real-time operating data (e.g., images, multi-media) to detect changes in the asset's equipment. In some embodiments, the system includes an advanced alert manager module configured to provide near real-time updates of an asset's condition. In some embodiments, the updates are in the form of a news story retrieved from the blob by a news API.

Figure 1:
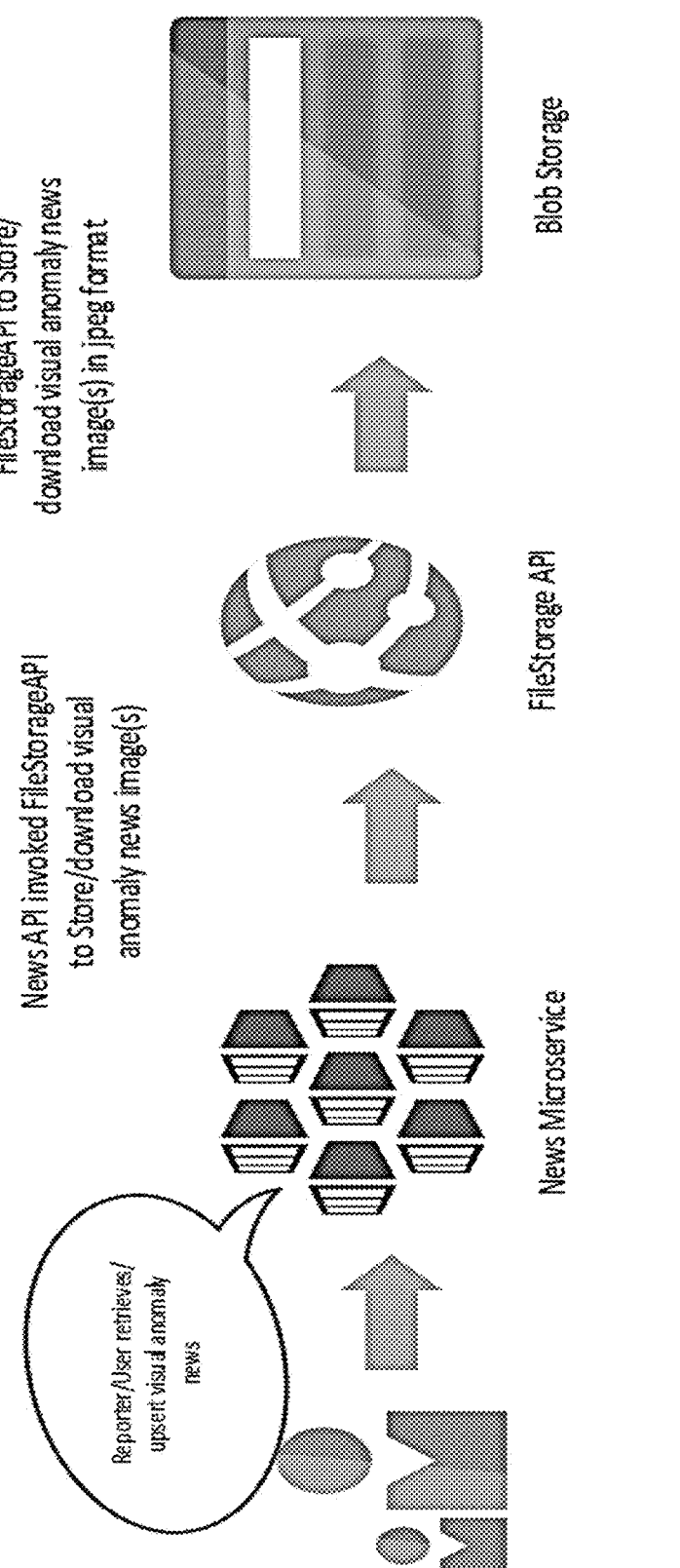
FIG. 1 shows high level details of the system according to some embodiments.

FIG. 1 shows high level details of the system according to some embodiments. The system described herein is in no way limiting and is only meant to aid those of ordinary skill in making and using the system. From left to right, FIG. 1 shows reporters, a news microservice, a file storage API, and blob storage according to some embodiments. In some embodiments, the reporters are responsible to report visual anomaly news and associated images (e.g., using Base64String format) to a news microservice endpoint. In some embodiments, the news microservice is configured to enable the file storage API to preserve images associated with the visual anomaly news under an external blob container. In some embodiments, the news microservice is configured to delegate request to the file storage API to retrieve one or more images. In some embodiments, the news collection in Cosmos DB does not store visual data and it maintains the number of visuals associated with the news.

In some embodiments, the file storage API is configured to store/retrieve images of anomaly news in one or more common external storage blob containers associated with a tenant ID. In some embodiments, service identity-based authentication is established between the news microservice and the file storage API leveraging a cloud-based identity and access management module (e.g., Azure Active Directory).

In some embodiments, the news microservice has been enhanced to add an API to download visuals from blob associated to a specific news story. In some embodiments, the system is configured to require and/or enable a user to send the visual anomaly news id and requested visual download format. In some embodiments, the system includes Base64String formats and ImageFile formats.

In some embodiments, for Base64String formats, all image data associated with the requested news item will be fetched from blob. In some embodiments, the client and/or UI is responsible to decode it to the format after being received. In some embodiments, for ImageFile formats, an image file will be returned in the response. In some embodiments, if the associated News has more than one image, then the client/UI is required to make separate requests to download each file. In some embodiments, when a data source or tenant is requested for deletion & successfully deleted, all visual(s) associated to cleaned data source/tenant will also be deleted from file storage.

The following is an example use case according to some embodiments:

1. Reporter posts Visual Anomaly News through News Microservice endpoint.
2. News Microservice validates request.
   a. If visual data is not in Base64String format, Bad request is returned (Error Code: 400).
3. On successful validation, visual(s) will be stored into external blob container.
   a. If visual upload fails for any reason, reported news will not be generated and an appropriate failure status is returned to the reported.
4. On successful visual upload, visual anomaly news will be added in the news collection with the count of visual(s).

The following is an example data source/tenant deletion according to some embodiments:

1. Admin user deletes a data source or tenant.
2. News microservice listening to an event in an event hub processes the message and starts the cleanup process
3. News microservice will fetch all visual anomaly news associated to the data source or tenant & deletes the visual(s) from external blob containers.
4. News microservice also deletes all the news associated to the deleted data source or tenant from news collection FIGS. 2-4 depict enabling API specifications for some embodiments presented herein.

FIG. 2 shows a download news visual(s) as imageFile request according to some embodiments.

FIG. 3 shows a download news visual(s) as Base64String request according to some embodiments.

FIG. 4 depicts an upsert news image in Base64String request according to some embodiments.

Figure 5:
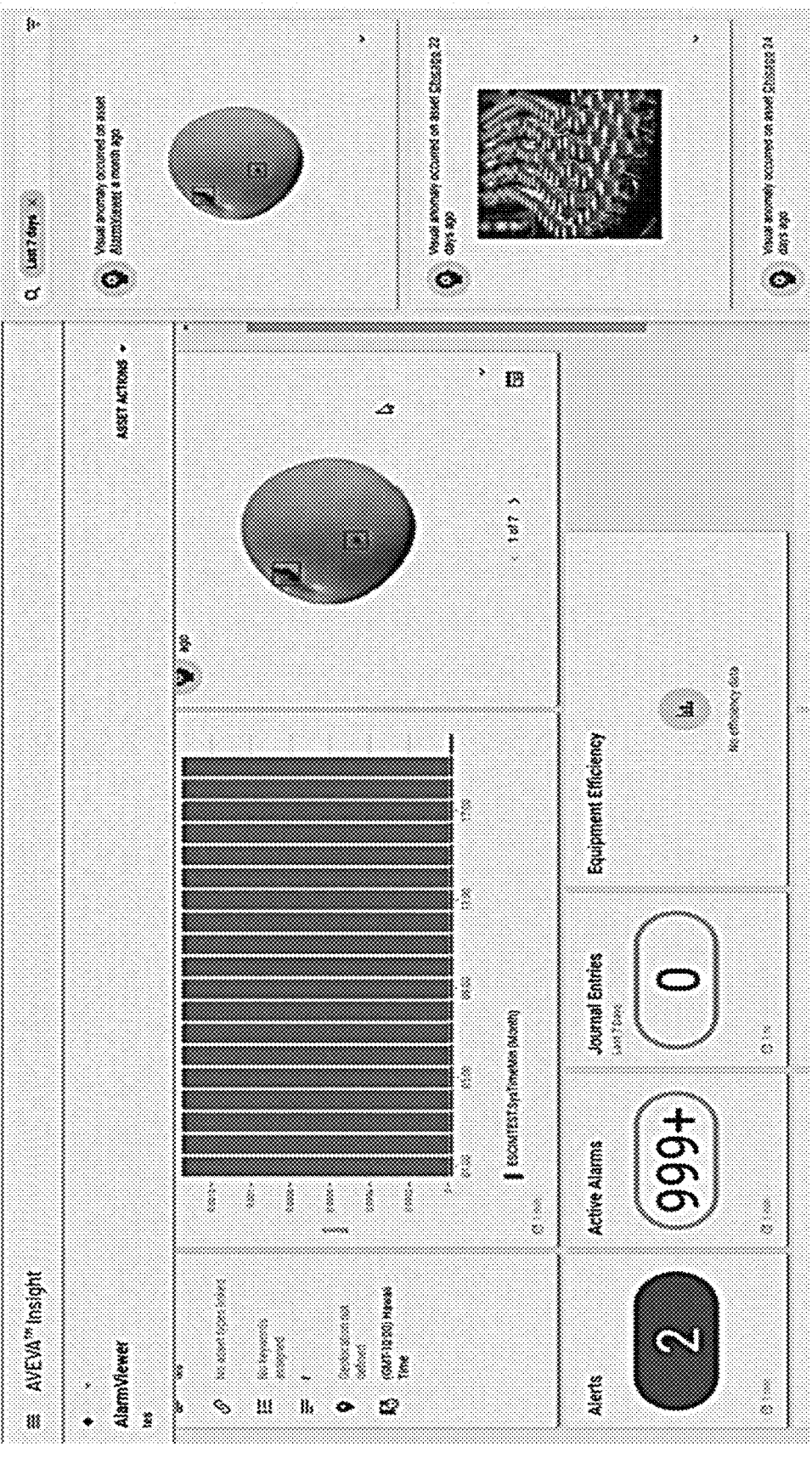
FIG. 5 shows a visual anomaly reported as a news feed on the right-hand side according to some embodiments.

FIG. 5 shows a visual anomaly reported as a news feed on the right-hand side according to some embodiments. In some embodiments, after the system receives the visual anomaly it is propagated to any device subscribed to the asset and/or equipment identifier.

Figure 6:
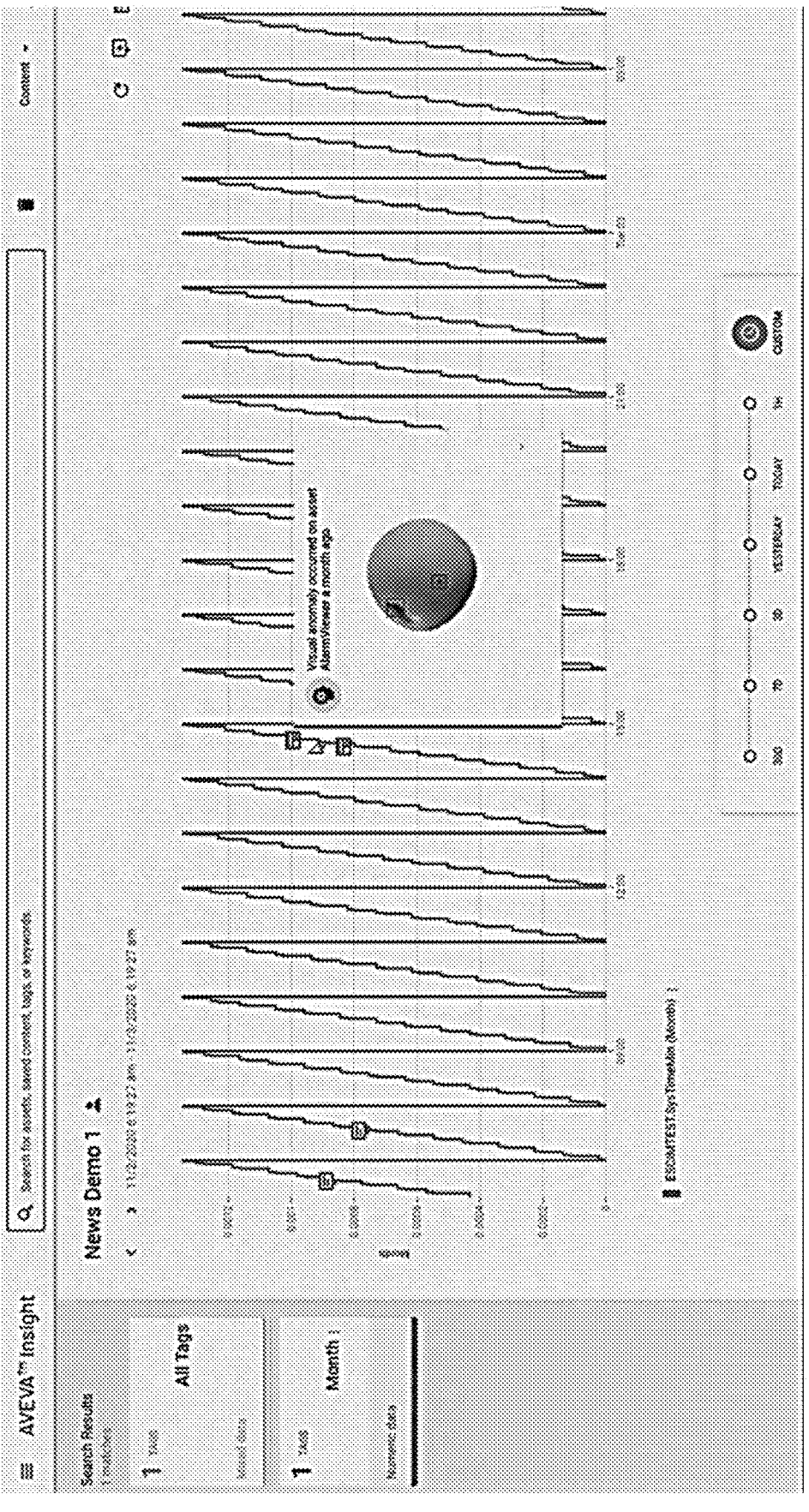
FIG. 6 illustrates the visual anomaly of FIG. 5 displayed associated with a trend chart after being clicked on in the news feed according to some embodiments.

FIG. 6 illustrates the visual anomaly of FIG. 5 displayed associated with a trend chart after being clicked on in the news feed. In some embodiments, visual anomalies show up as notes on the trend chart. In some embodiments, selecting on a note in the trend chart causes an image of the visual anomaly to be generated by the system.

Figure 7:
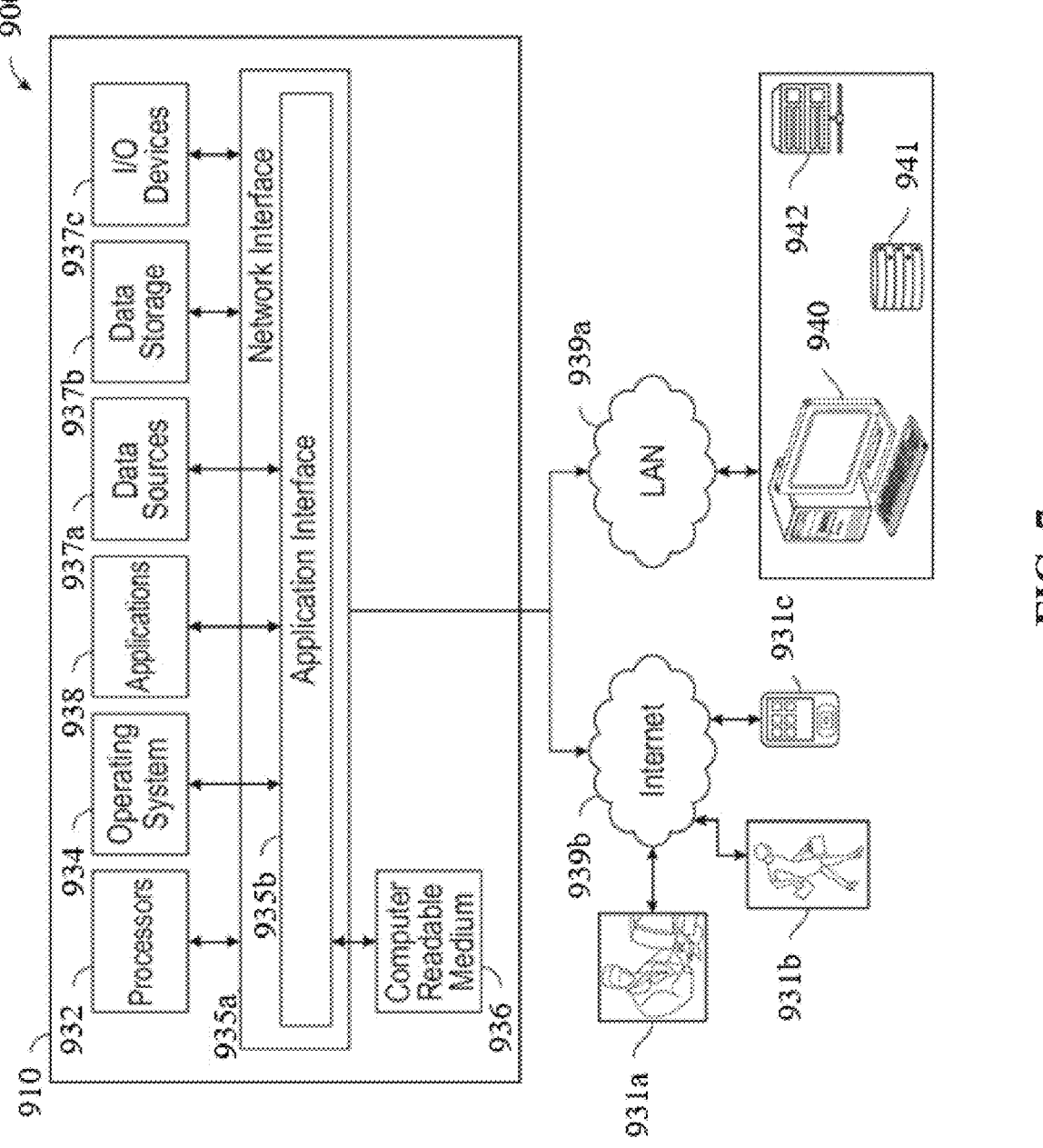
FIG. 7 illustrates a computer system 910 enabling or comprising the systems and methods in accordance with some embodiments of the system.

FIG. 7 illustrates a computer system 910 enabling or comprising the systems and methods in accordance with some embodiments of the system. In some embodiments, the computer system 910 can operate and/or process computer-executable code of one or more software modules of the aforementioned system and method. Further, in some embodiments, the computer system 910 can operate and/or display information within one or more graphical user interfaces (e.g., HMIs) integrated with or coupled to the system.

In some embodiments, the computer system 910 can comprise at least one processor 932. In some embodiments, the at least one processor 932 can reside in, or coupled to, one or more conventional server platforms (not shown). In some embodiments, the computer system 910 can include a network interface 935a and an application interface 935b coupled to the least one processor 932 capable of processing at least one operating system 934. Further, in some embodiments, the interfaces 935a, 935b coupled to at least one processor 932 can be configured to process one or more of the software modules (e.g., such as enterprise applications 938). In some embodiments, the software application modules 938 can include server-based software and can operate to host at least one user account and/or at least one client account, and operate to transfer data between one or more of these accounts using the at least one processor 932.

With the above embodiments in mind, it is understood that the system can employ various computer-implemented operations involving data stored in computer systems. Moreover, the above-described databases and models described throughout this disclosure can store analytical models and other data on computer-readable storage media within the computer system 910 and on computer-readable storage media coupled to the computer system 910 according to various embodiments. In addition, in some embodiments, the above-described applications of the system can be stored on computer-readable storage media within the computer system 910 and on computer-readable storage media coupled to the computer system 910. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 910 can comprise at least one computer readable medium 936 coupled to at least one of at least one data source 937a, at least one data storage 937b, and/or at least one input/output 937c. In some embodiments, the computer system 910 can be embodied as computer readable code on a computer readable medium 936. In some embodiments, the computer readable medium 936 can be any data storage that can store data, which can thereafter be read by a computer (such as computer 940). In some embodiments, the computer readable medium 936 can be any physical or material medium that can be used to tangibly store the desired information or data or instructions and which can be accessed by a computer 940 or processor 932. In some embodiments, the computer readable medium 936 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 936 can transmit or carry instructions to a remote computer 940 and/or at least one user 931, including a router, private or public network, or other transmission or channel, both wired and wireless. In some embodiments, the software application modules 938 can be configured to send and receive data from a database (e.g., from a computer readable medium 936 including data sources 937*a* and data storage 937*b* that can comprise a database), and data can be received by the software application modules 938 from at least one other source. In some embodiments, at least one of the software application modules 938 can be configured within the computer system 910 to output data to at least one user 931 via at least one graphical user interface rendered on at least one digital display.

In some embodiments, the computer readable medium 936 can be distributed over a conventional computer network via the network interface 935*a* where the system embodied by the computer readable code can be stored and executed in a distributed fashion. For example, in some embodiments, one or more components of the computer system 910 can be coupled to send and/or receive data through a local area network ("LAN") 939*a* and/or an internet coupled network 939*b* (e.g., such as a wireless internet). In some embodiments, the networks 939*a*, 939*b* can include wide area networks ("WAN"), direct connections (e.g., through a universal serial bus port), or other forms of computer-readable media 936, or any combination thereof.

In some embodiments, components of the networks 939*a*, 939*b* can include any number of personal computers 940 which include for example desktop computers, and/or laptop computers, or any fixed, generally non-mobile internet appliances coupled through the LAN 939*a*. For example, some embodiments include one or more of personal computers 940, databases 941, and/or servers 942 coupled through the LAN 939*a* that can be configured for any type of user including an administrator. Some embodiments can include one or more personal computers 940 coupled through network 939*b*. In some embodiments, one or more components of the computer system 910 can be coupled to send or receive data through an internet network (e.g., such as network 939*b*). For example, some embodiments include at least one user 931*a*, 931*b*, is coupled wirelessly and accessing one or more software modules of the system including at least one enterprise application 938 via an input and output ("I/O") 937*c*. In some embodiments, the computer system 910 can enable at least one user 931*a*, 931*b*, to be coupled to access enterprise applications 938 via an I/O 937*c* through LAN 939*a*. In some embodiments, the user 931 can comprise a user 931*a* coupled to the computer system 910 using a desktop computer, and/or laptop computers, or any fixed, generally non-mobile internet appliances coupled through the internet 939*b*. In some embodiments, the user can comprise a mobile user 931*b* coupled to the computer system 910. In some embodiments, the user 931*b* can connect using any mobile computing 931*c* to wireless coupled to the computer system 910, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of abnormality detection and reporting by automatic detection and display of a abnormal line item. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g. a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for reporting visual anomalies within an industrial environment comprising:

one or more processors; and a non-transitory computer readable medium storing a plurality of instructions, which when executed, cause the one or more processors to:

execute, by the one or more processors, an image analysis one or more images stored in an image database, the image analysis comprising an anomaly algorithm configured to determine a change in at least a portion of the one or more images;

store, by the one or more processors, the one or more images comprising the change in an anomaly database as one or more anomaly images;

generate, by the one or more processors, an equipment association between the one or more anomaly images with one or more equipment assets in the industrial environment;

generate, by the one or more processors, a reporting link between a managed historian news microservice and the equipment association;

store, by the one or more processors, structured news information associated with the one or more anomaly images without storing the one or more anomaly images in a news collection database, the structured news information including a number of visuals associated with a news item;

store, by the one or more processors, the one or more anomaly images in one or more external blob storage containers using a file storage application programming interface (API); and cause, by the one or more processors, a news story from the managed historian news microservice to be displayed on a graphical user interface in response to a request associated with the managed historian news microservice and the structured news information stored in the news collection, that the news story comprising the one or more anomaly images retrieved from the one or more external blob storage containers using the file storage API.

2. The system of claim 1, further comprising a predictive analytic module configured to use artificial intelligence to analyze one or more asset's operating history and create one or more operational profiles for one or more pieces of equipment.

3. The system of claim 2, wherein the predictive analytic module is configured to compare historical operating data with real-time operating data to detect the change.

4. The system of claim 3, further comprising an advanced alert manager module configured to provide near real-time updates of an asset's condition.

5. The system of claim 4, wherein the near real-time updates the news story, where the news story is retrieved from the blobs by a news API.

6. A method for reporting visual anomalies within an industrial environment comprising:

executing an image analysis one or more images stored in an image database, the image analysis comprising an anomaly algorithm configured to determine a change in at least a portion of the one or more images;

storing images comprising the change in an anomaly database as one or more anomaly images;

generating an equipment association between the one or more anomaly images with one or more equipment assets in the industrial environment;

generating a reporting link between a managed historian news microservice and the equipment association;

storing structured news information associated with the one or more anomaly images without storing the one or more anomaly images in a news collection database, the structured news information including a number of visuals associated with a news item;

storing the one or more anomaly images in one or more external blob storage containers using a file storage application programming interface (API); and causing a news story from the managed historian news microservice to be displayed on a graphical user interface in response to a request associated with the managed historian news microservice and the structured news information stored in the news collection, the news story comprising the one or more anomaly images retrieved from the one or more external blob storage containers using the file storage API.

7. The method of claim 6, further comprising a predictive analytic module configured to use artificial intelligence to analyze one or more asset's operating history and create one or more operational profiles for one or more pieces of equipment.

8. The method of claim 7, wherein the predictive analytic module is configured to compare historical operating data with real-time operating data to detect the change.

9. The method of claim 8, further comprising an advanced alert manager module configured to provide near real-time updates of an asset's condition.

10. The method of claim 9, wherein the near real-time updates the news story, where the news story is retrieved from the blobs by a news API.

11. A computer program product, comprising a non-transitory computer-readable medium having computer-readable program code embodied therein to be executed by one or more processors, the program code including instructions to:

execute an image analysis one or more images stored in an image database, the image analysis comprising an anomaly algorithm configured to determine a change in at least a portion of the one or more images;

store images comprising the change in an anomaly database as one or more anomaly images;

generate an equipment association between the one or more anomaly images with one or more equipment assets in the industrial environment;

generate a reporting link between a managed historian news microservice and the equipment association;

store structured news information associated with the one or more anomaly images without storing the one or more anomaly images in a news collection database, the structured news information including a number of visuals associated with a news item;

store the one or more anomaly images in one or more external blob storage containers using a file storage application programming interface (API); and cause a news story from the managed historian news microservice to be displayed on a graphical user interface in response to a request associated with the managed historian news microservice and the structured news information stored in the news collection, the news story comprising the one or more anomaly images retrieved from the one or more external blob storage containers using the file storage API.

12. The computer program product of claim 11, further comprising a predictive analytic module configured to use artificial intelligence to analyze one or more asset's operating history and create one or more operational profiles for one or more pieces of equipment.

13. The method of claim 12, wherein the predictive analytic module is configured to compare historical operating data with real-time operating data to detect the change.

14. The method of claim 13, further comprising an advanced alert manager module configured to provide near real-time updates of an asset's condition.

15. The method of claim 14, wherein the near real-time updates the news story, where the news story is retrieved from the blobs by a news API.

* * * * *